United States Patent
Petronis et al.

(10) Patent No.: US 8,431,034 B2
(45) Date of Patent: Apr. 30, 2013

(54) MANUFACTURING OF NANOPORES

(76) Inventors: Sarunas Petronis, Göthenburg (SE); Bengt Kasemo, Kopmannebro (SE)

(*) Notice: Subject to any disclaimer, the term of this patent is extended or adjusted under 35 U.S.C. 154(b) by 155 days.

(21) Appl. No.: 12/988,571

(22) PCT Filed: Apr. 22, 2009

(86) PCT No.: PCT/SE2009/000207
§ 371 (c)(1), (2), (4) Date: Nov. 19, 2010

(87) PCT Pub. No.: WO2009/131517
PCT Pub. Date: Oct. 29, 2009

(65) Prior Publication Data
US 2011/0048947 A1  Mar. 3, 2011

(30) Foreign Application Priority Data
Apr. 22, 2008 (JP) .................................. 2008-111371

(51) Int. Cl.
*B31D 3/00* (2006.01)
*B44C 1/22* (2006.01)

(52) U.S. Cl.
USPC .................. 216/56; 216/40; 216/41; 216/42; 216/52; 977/856

(58) Field of Classification Search ............ 216/40, 216/41, 42, 52, 56; 977/856
See application file for complete search history.

(56) References Cited

U.S. PATENT DOCUMENTS

| 5,753,014 | A | 5/1998 | Van Rijn |
| 7,241,396 | B2* | 7/2007 | Yagi et al. ................ 216/56 |
| 2003/0020024 | A1* | 1/2003 | Ferain et al. ............... 250/492.1 |
| 2005/0092676 | A1* | 5/2005 | Dalton et al. ............. 210/500.26 |
| 2006/0278580 | A1* | 12/2006 | Striemer et al. ............. 210/650 |
| 2007/0080107 | A1* | 4/2007 | Yang et al. ................ 210/490 |

FOREIGN PATENT DOCUMENTS

| DE | 102007029445 | 12/2008 |
| WO | 2006119915 | 11/2006 |
| WO | 2008086477 | 7/2008 |

OTHER PUBLICATIONS

Moon et al., "Colloidal lithography with crosslinkable particles: fabrication of hierarchical nanopore arrays" Chem. Commun., 2005, pp. 4107-4109.

The International Search Report and Written Opinion mailed on Aug. 21, 2009, in connection with PCT Application No. PCT/SE2009/000207.

* cited by examiner

*Primary Examiner* — Shamim Ahmed
(74) *Attorney, Agent, or Firm* — Gesmer Updegrove LLP (57) ABSTRACT

The present invention relates to nanopore membranes, methods for manufacturing such nanopore membranes, and uses thereof. In the methods for manufacturing the membranes colloidal lithography is used, which results in production of nanosize pores in a short time and on a large scale. The nanopore membranes have a narrow size distribution and are randomly arranged. Furthermore, the inter-pore distance shows very little variation.

25 Claims, 5 Drawing Sheets

| Step Nr. | Schematic illustration |
|---|---|
| 1 |  |
| 2 |  |
| 3 |  |
| 4 |  |
| 5 |  |
| 6 |  |
| 7 |  |
| 8 |  |
| 9 |  |
| 10 |  |
| 11 |  |
| 12 |  |

SEM images and size distribution histograms of colloidal particles and nanopores
Scale ⊢⎯100 nm 90                        130
Count: 56      Min: 100.18483
Mean: 109.86114      Max: 118.32494
StdDev: 3.82612      Mode: 106 (21)
Bins: 10      Bin Width: 4

Colloidal particles adsorbed on a membrane.

70                        110
Count: 36      Min: 82.76956
Mean: 88.49914      Max: 94.00154
StdDev: 3.08893      Mode: 86 (16)
Bins: 10      Bin Width: 4

Etched nanopores imaged on the first side of a membrane.

70                        110
Count: 29      Min: 80.49323
Mean: 87.93902      Max: 96.30566
StdDev: 4.02551      Mode: 82 (11)
Bins: 10      Bin Width: 4

Etched nanopores imaged on the second side of a membrane.

*Fig.5*

MANUFACTURING OF NANOPORES

PRIORITY INFORMATION

The present application is a 371 National Phase application of International Application No. PCT/SE2009/000207, filed on Apr. 22, 2009, which claims priority to Japanese Application No. 2008-111371, filed on Apr. 22, 2008. Both applications are incorporated herein by reference in their entireties.

TECHNICAL FIELD

The present invention relates to nanopore membranes, i.e. membranes comprising nanosized pores, methods for making such nanopore membranes, and uses thereof.

BACKGROUND OF THE INVENTION

The separation of molecules in biological fluids is a basic procedure which is involved in nearly all biotechnology and pharmaceutical industry processes, both in laboratory scale and in production scale. It is also important in clinical diagnosis and disease treatment, for example in hemodialysis, and the most elemental device for solute separation is a porous membrane filter. Thus, a revolutionary advance in filter technology has the potential to impact many areas of industry and human health.

Filters that are able to catch nanosize objects, such as viruses and bacteria, are also of great importance in air and water purification systems and low temperature sterilization of drug solutions. Such air filtering is used for example in airplanes and in military devices in order to protect from biological and chemical weapons of mass destruction used in war or terrorism attacks. In addition to air, efficient filtering of water and liquids from nanosized contamination is of equal importance. First of all, this would increase drinkable water sources in developing countries, but there are also Research and Development (R&D) efforts directed towards filtering off viruses such as HIV out of other liquids, including human blood serum.

Typical filter materials are made as woven matrices of plastic or cellulose polymers. Filters manufactured in this manner naturally contain a wide distribution of pore sizes and the smallest pores will eventually clog with small molecules of the filtrate. The abundance of small pores and large filter thicknesses are the two major sources of resistance to flow across membrane filters as described in Tong et al., "Silicon Nitride Nanosieve Membrane," Nano Letters 4:283-287 (2004). Moreover, such filters have very limited resistance to thermal conditions (they usually degrade at temperatures above 200° C.) or chemical environments (they are affected by solvents, acids and bases).

Recent advances in nanotechnology allow fabrication of very thin filter membranes with high density and high precision of pore sizes down to a few nanometers in diameter. However, such fabrication involves very expensive equipment (such as electron beam lithography (EBL) or focused ion beam drilling (FIB)) and is very inefficient when a large number of nanopores needs to be produced, because they are based on serial process (i.e. one nanopore has to be produced after another).

U.S. patent application Ser. No. 11/414,991 discloses a process for the manufacturing of a porous nanoscale membrane. In the final step a plurality of spaced nanopores are formed by removal of oxide masks. However the produced nanopores, as disclosed in the patent, have relatively low density and broad size distribution of the nanopores, especially in case of larger pores (>20 nm).

U.S. Pat. No. 5,753,014 discloses membrane filters comprising a membrane provided with pores having a pore size between 5 nm and 50 □m, methods for manufacturing such membrane filters and uses thereof. The membrane layer is provided with pores by means of a patterned auxiliary layer which is brought in the desired pattern by a photolithographic or imprinting technique. The pattern is transferred to the membrane layer by etching. It is mentioned that one way of producing the membrane pores is lifting off parts of the membrane layer and subjacent parts of the patterned masking layer. This lift-off process increases the surface roughness of the membrane thereby rendering it less suitable for certain applications, e.g. medical or bio-medical applications.

DEFINITIONS

The following definitions shall apply throughout the specification and the appended claims unless specifically stated otherwise.

A "pore" or "perforation" is defined as an opening extending through e.g. a membrane, i.e. the opening goes from one side of the membrane to the other side and there are two open ends. In contrast, the terms "cavity", "pit" and "hole" denote an opening in e.g. a membrane so that there is an open end and a closed end.

The term nanosized pore as used in this document is defined as a pore having a size in the nanometer, submicrometer or micrometer range, i.e. 3-3000 nm.

The term fouling is defined as the deposition of insoluble materials, such as bacteria, colloids, oxides, biomolecules and water-borne debris, onto the surface of the membrane.

It shall be understood that support material can have various shapes, e.g. it can be flat, round, curved or rectangular.

Nanolithography is defined as a set of methods used for fabrication of nanometer-scale structures.

A polyelectrolyte is a macromolecule (i.e. a polymer) containing positive and negative charges, Colloids are very small, finely divided solids (i.e. particles that do not dissolve) that remain dispersed in a liquid for a long time due to their small size and electrical charge.

Nano-scale as used in this document refers to dimensions below 3000 nm.

Abbreviations
CL colloidal lithography
nm nanometer
PS polystyrene
ACH aluminium chloride hydroxide
PDDA poly(diallyldimethylammonium chloride)
PSS poly(sodium 4-styrenesulfonate)
mM millimolar
RIE reactive ion etching
EBL electron beam lithography
FBL focused ion beam lithography
s second
LP-CVD low-pressure chemical vapour deposition
PA-CVD plasma-assisted chemical vapour deposition
PDMS polydimethylsiloxane
KOH potassium hydroxide
HNA A mixture of hydrofluoric acid, nitric acid and acetic acid
TMAH Tetra Methyl Ammonium Hydroxide
EDP Ethylene Diamine Pyrocathechol
AG Amine Gallate
TEM Transmission Electron Microscopy
SEM Scanning Electron Microscopy RDF Radial Distribution Function
rpm rotations per minute
$R_{RMS}$ root-mean-squared amplitude of roughness
$R_{MAX}$ max peak height in the roughness amplitude
RCA clean a standard set of wafer cleaning steps developed by Werner Kern while working for RCA, the Radio Corporation of America. It involves three steps: 1) removal of the organic contaminants; 2) removal of thin oxide layer; and 3) removal of ionic contamination. The first step (called SC-1, where SC stands for Standard Clean) is performed with a 1:1:5 solution of $NH_4OH+H_2O_2+H_2O$ at 75 or 80 degrees Celsius. The second step is a short immersion in a 1:50 solution of $HF+H_2O$ at 25 degrees Celsius, in order to remove the thin oxide layer and some fraction of ionic contaminants. The third and last step (called SC-2) is performed with a 1:1:6 solution of $HCl+H_2O_2+H_2O$ at 75 or 80 degrees Celsius.

DESCRIPTION

The present invention is directed to ultrathin nanoscale membranes, methods of making these membranes, and their use in biosensors, drug delivery systems, in the sieving, separation and purification of small molecules and biomolecules; in the filtering of gases and liquids; in low temperature sterilization of fluids and in fuel cell membranes.

Surprisingly, we have found that very thin membranes comprising nanosized pores can be produced in a short time and on a large scale without the use of expensive equipment. In this process colloidal lithography is used. This new process may combine traditional photolithography with colloidal nano lithography. In this way, the manufacturing of nanopores is made in a parallel fashion, i.e. all the nanopores in the membrane are created simultaneously. The pores of the resulting membranes have a narrow size distribution and are randomly arranged with a controlled mean inter-pore spacing. Furthermore, the inter-pore distance shows very little variation. When the pores are produced by means of an adhesive material applied on the colloidal particles (for instance a Scotch tape or SWT-10 adhesive tape) the resulting pore containing membrane has a low surface roughness ($R_{RMS}<2$ nm, $R_{MAX}<6$ nm for a 100 nm thick membrane) that renders it suitable in applications where this is important, e.g. in medical and bio-medical filtration purposes.

It is to be understood that in the process of the present invention the individual process steps may be performed in individual orders, i.e. different sequences of the process steps may be chosen. For example, the photolithography step used to fabricate an intact supported membrane may take place prior to the step of colloidal lithography used to produce nanopores. Alternatively, the step of colloidal lithography may take place before the step of photolithography.

While photolithography is well known by persons skilled in the art, the technique colloidal lithography is less well known. The principles and different versions of colloidal lithography (CL) are reviewed by Yang et al. (Seung-Man Yang, Se Gyu Jang, Dae-Geun Choi, Sarah Kim, and Hyung Kyun Yu, Nanomachining by Colloidal Lithography, Small 2006, 2, No. 4, 458-475). For using CL to template nanopores in the supported thin membrane, it is important that colloidal particles are sparse on the surface, i.e. not in a contact with each other, in order to avoid fabrication of laterally interconnecting nanopores which cause wide pore size distribution and lower mechanical strength of the membrane. Thus only special versions of CL are suitable for the purposes of the method of the present invention, and some of these are exemplified below.

Colloidal Lithography

Figure 1A:
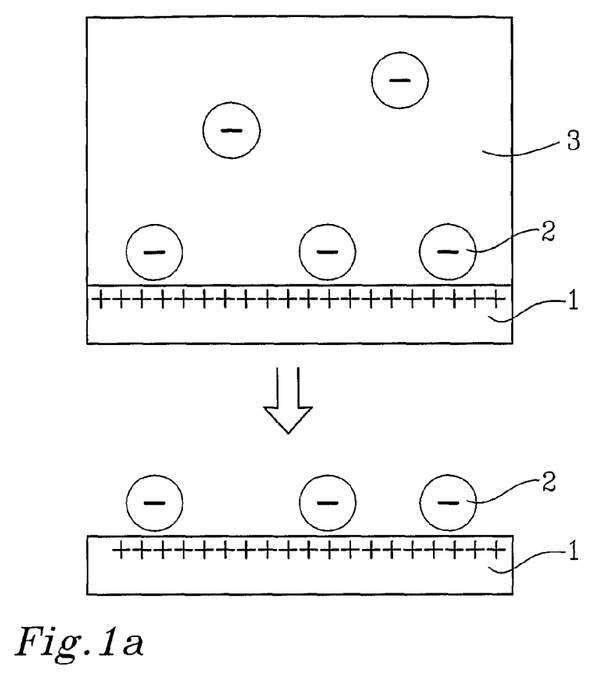
FIG. 1a shows the electrostatic self-assembly of charged colloidal particles onto an oppositely charged surface.

Colloidal lithography as used in the invention of the present patent application is based on the electrostatic self-assembly of charged colloidal particles onto an oppositely charged surface. This is illustrated in FIG. 1a. The charge of the surface can be controlled by adsorbing single or multiple layers of polyelectrolytes on the surface so that the resulting surface has a charge that is opposite to that of the colloidal particles in the colloidal solution.

Figure 1B:
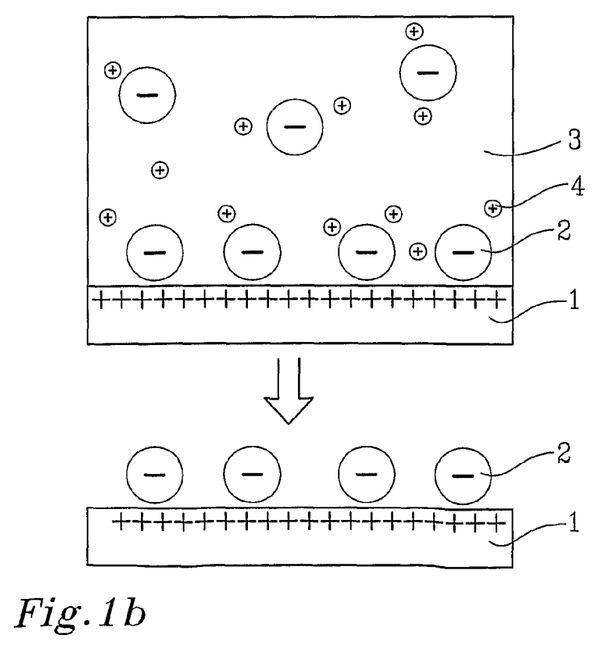
FIG. 1b shows the repulsive interaction between the colloidal particles that can be reduced by introducing ions having a charge of opposite sign to that of the colloidal particles in the colloidal solution, which cause shorter inter-particle distance between the adsorbed colloids.

Electrostatic repulsion forces between colloidal particles of the same charge cause characteristic spacing between the particles adsorbed on the surface. The repulsive interaction between the colloidal particles can be reduced by introducing ions having a charge of opposite sign to that of the colloidal particles in the colloidal solution, which cause shorter inter-particle distance between the adsorbed colloids. This is illustrated in FIG. 1b. Thus, addition of ions of opposite sign to the colloidal solution is a way of affecting the distance between the colloidal particles adsorbed on the surface.

Typical materials that can be used in colloidal lithography are colloidal particles and polyelectrolytes.

Examples of colloidal particles include monodispersed polystyrene (PS) spheres and silica colloids. Monodispersed polystyrene (PS) spheres are commercially available in sizes from about 20 nm to several μm, and may be purchased from e.g. Interfacial Dynamics Corporation, Oregon, USA. A typical size distribution of these particles is CV (Coefficient of Variation defined as Standard Deviation/Mean) of 2-5%. The particle size distribution is higher for particle sizes below 80 nm for which the particle size distribution reaches 10% CV.

Silica colloids having diameters from a few nm and upward are commercially available, and may be purchased from e.g. Eka Chemicals, Bohus, Sweden. Typically, the colloidal particles are suspended in water (1-5% by weight).

Polyelectrolytes can be positively or negatively charged. Examples of positively charged polyelectrolytes include aluminium chloride hydroxide (ACH), which may be purchased from Reheis, and poly(diallydimethylamonium chloride) (PDDA), which is commercially available from Sigma-Aldrich. An example of a negatively charged polyelectrolyte is poly(sodium 4-styrenesulfonate) (PSS), which is commercially available from Sigma-Aldrich. Typically, ACH, PDDA and PSS are dissolved in water (5% by weight for ACH, and 2% by weight for PDDA and PSS).

Salts may be added to the colloidal solution in order to reduce the electrostatic repulsion between charged colloidal particles. For example, NaCl can be added to the colloidal solution. Typically, the salt concentrations are between 0 and 50 mM.

A typical colloidal lithography sequence is as follows.

Step 1 (Optional). Charging the Surface of the Substrate.

The substrate might have a native surface charge of opposite sign than the colloidal particles. In such case it might be used in Step 2 directly. Otherwise, if the charge is too weak or if it has the same sign as the colloidal particles, the surface might be charged by adsorbing a single layer of polyelectrolyte having the desired charge (i.e having a charge that is opposite to the charge of the colloidal particles), or multiple layers (typically triple layers, e.g. <+><−><+> combination) of polyelectrolytes of opposite charges, so that the last layer contains desired charge sign. A triple layer of ACH-PSS-ACH may be used in the processes. Before the deposition of the layer of polyelectrolyte(s), the surface of the substrate may be cleaned in oxygen plasma (for example 30 seconds in 50 W, 250 mTorr, PlasmaTherm Batchtop VII RIE/PE 95M). The deposition of each polyelectrolyte layer may be made by immersing the surface into electrolyte solution for 30 s, rinsing in water for 30 s and drying by nitrogen blow or spinning. The thickness of the final adsorbed polyelectrolyte layers is usually below 1 nm.

Step 2. Adsorption of Colloidal Particles from the Colloidal Solution.

Charged surfaces can be exposed to colloidal solution of negatively charged PS nanospheres (1% in water, 110 nm, sulphate latex, supplied by Invitrogen) for 2 minutes and then rinsed by water for 1 minute.

Step 3 (Optional). Immobilization of the Particles.

To increase the attachment of polymeric particles to the surface, they can be heated to the temperatures slightly above their melting temperature. If the melting temperature is above the boiling temperature of water, the water of the colloidal solution should be replaced by a liquid having a higher boiling temperature, e.g. ethylene glycol.

Step 4. Drying the Surface.

The surface was dried by nitrogen blow or by spinning. Surface tension during the drying process may cause colloidal particle displacement or detachment. In order to reduce surface tension during the drying process, water can be replaced by a liquid of lower surface tension, e.g. methanol, before drying.

Step 5 (Optional). Removal of Polyelectrolyte Layers

Organic compounds can be removed from the surface by mild oxygen plasma or UV-ozone treatment.

Thus, the use of colloidal particles affords the possibility to control particle size, particle size distribution and the distance between the particles.

Methods of Fabrication of Nanopores in Membranes

The membranes of the invention may be prepared as described in the methods below. However, the invention is not limited to these methods.

Method 1

Figure 2:
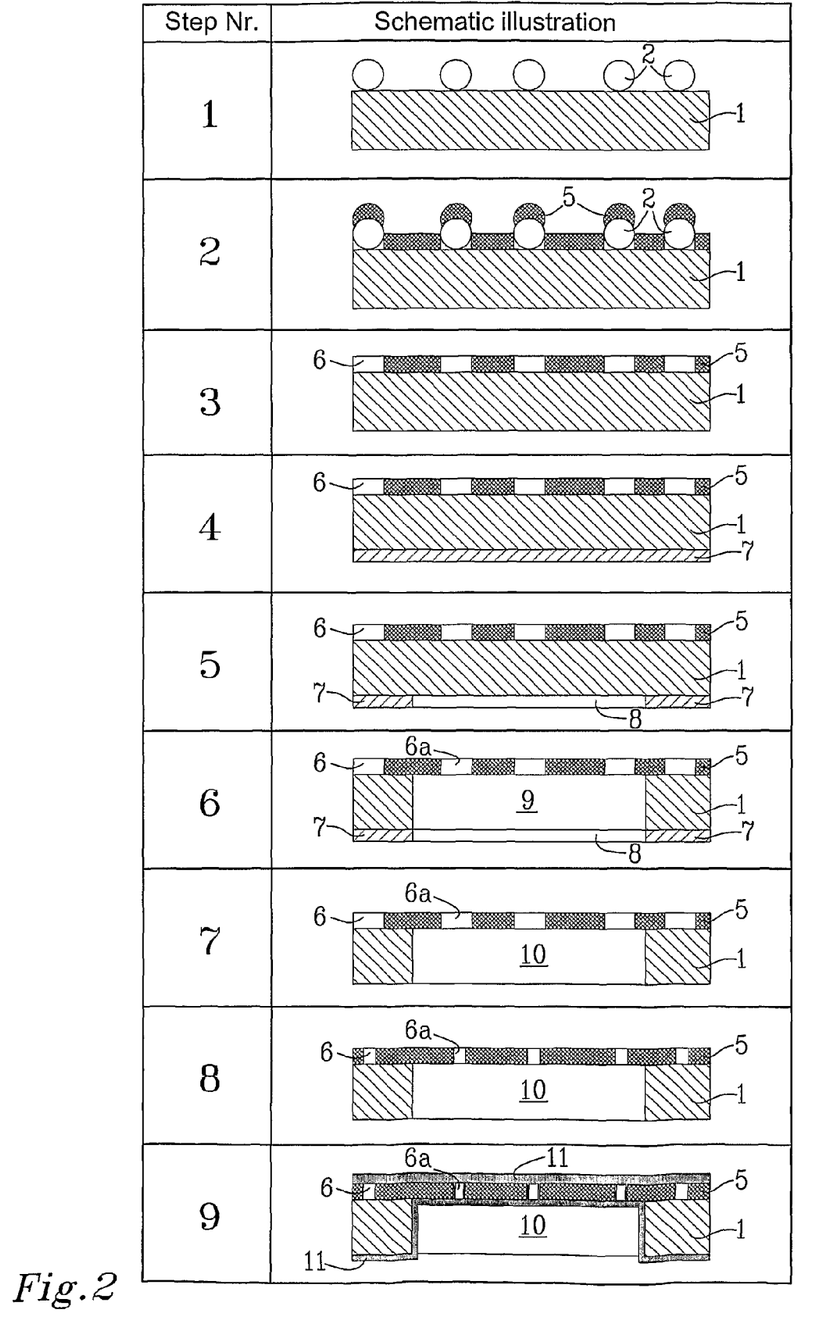
FIG. 2 is a schematic illustration of the steps of a first method of fabrication of nanopores in membranes described in the present invention.

Method 1 is described below, and is illustrated in FIG. 2.

Step 1. Adsorption of Colloidal Particles 2 on a First Side of the Support 1 (e.g. a Silicon (Si) Wafer).

Monocrystalline Si (100) or Si (110) wafers are preferred as the support materials due to their flatness, compatibility with microelectronics technologies and availability of well established microfabrication processing. Si wafers have to be cleaned prior to adsorption of the colloidal particles by RCA clean (10 min. at 80° C. in 1:1:5 vol % $H_2O_2$:$NH_4OH$:$H_2O$, 30 s in aqueous solution of 2% HF, and 10 min. at 80° C. in 1:1:5 vol % $H_2O_2$:HCl:$H_2O$). CL is performed as described above.

The adsorption of the colloidal particles may be performed as described above under Step 2.

Step 1a (Optional). Reduction of the Colloidal Particle Size by Chemical and/or Physical Etching.

The adsorbed colloidal particles may be shrunk by chemical etching (e.g. by ozone) or physical etching (e.g. by ion sputtering), or by combination of both, e.g. reactive ion etching (RIE) in oxygen plasma.

Step 2. Coating the Support 1 (on the First Side or on the First and Second Sides) and the Colloidal Particles 2 by a Membrane Forming Material 5 (e.g. $Si_3N_4$ or $SiO_2$).

Preferably, the membrane forming material 5 is more resistive to the chemical and/or physical etching than the support 1. The coating of the first side should not be thicker than the diameter of the colloidal particles, preferably not thicker than 50% or 33% of the colloidal particle diameter. The coating of the second side may be greater than, equal to or less than the diameter of the colloidal particles.

$Si_3N_4$ or $SiO_2$ are preferred membrane forming materials due to their high mechanical strength and high inertness/resistance to chemical corrosion by solvents, bases and most acids. These materials are widely used in electronics industry, so there are well established methods for thin film deposition of these materials, such as low pressure chemical vapour deposition (LP-CVD), plasma assisted chemical vapour deposition (PA-CVD), ion sputtering or heat-induced physical vapour deposition.

The coating of the support 1 is preferably done by an anisotropic deposition of the membrane forming material 5. Depending on the deposition angle, which may be perpendicular or at some inclination to the surface of the support 1, differently shaped shadowed areas under the particles will be created. Perpendicular deposition will cause round shadowed area. Inclined deposition will cause elliptic shadowed areas.

Step 3. Removal of the Covered Colloidal Particles from the Support 1 Yielding the Cavities 6 in the Membrane Forming Material 5 in the Shadowed Area Beneath Each Colloidal Particle.

Removal of the particles should be performed in such a way that the membrane forming material 5 and the support 1 are not destroyed. It can be performed by applying an adhesive material in one or more of the following ways:

a) applying and removing an adhesive tape, so that the colloidal particles and at least part of the membrane material covering the colloidal particles stick to the tape and come off from the surface of the support 1 together with the removed tape, or b) applying and removing a glue-less adhesive tape (e.g. polydimethylsiloxane [PDMS] rubber), so that the colloidal particles and at least part of the membrane material covering the colloidal particles stick to the tape and come off from the surface of the support 1 together with the removed tape.

Step 4 (Optional). Coating a Second Side of the Support 1 with a Protective Material 7 (e.g. $Si_3N_4$ or $SiO_2$), Said Protective Material being More Resistive to Chemical and/or Physical Etching than the Support 1, in the Case where Only a First Side of the Support was Covered by the Membrane Forming Material 5 in Step 2 or if the Membrane Forming Material Coated on the Second Side in Step 2 is not Resistive to the Chemical or Physical Etching Applied in Step 6.

The coating with protective material 7 can be performed as described in Step 2, but the thickness of the coating is not limited to the colloidal particle diameter. The coating with protective material 7 may be greater than, equal to or less than the diameter of the colloidal particles, and should be thick enough to withstand the etching in Step 6. Typically the protective material 7 is $Si_3N_4$ or $SiO_2$ or polymer layer for wet etching of Si, and metals or polymers for dry etching of Si in plasma (see description in Step 6).

Step 5. Performing Photolithography on the Second Side of the Support 1, Said Second Side Being Opposite to the First Side where Colloidal Particles were Applied and Removed in Steps 2-3, in Order to Remove the Protective Layer in the Designated Areas (Windows).

The photolithography step typically consists of coating the second side of the surface of the support 1 by a photoresist material, exposing it to UV light via an opaque mask with transparent pattern (windows), and dissolving the photoresist material in the exposed areas by a developer. After the photolithography step, the photoresist material covers the protective material 7 in all areas except where the photoresist material has been dissolved. In these uncovered areas, i.e. those areas lacking photoresist material, the protective material 7 can be etched away by chemical and/or physical etching. For example $SiO_2$ and $Si_3N_4$ can be etched by buffered HF acid or by RIE in $CF_4$ plasma.

Step 6. Etching the Support Through the Windows 8 Until the Membrane Material is Reached on the Opposite Side of the Support.

Etching results in a new window 9. The windows 8 and 9 are commonly designated 10. The membrane forming material forms nanostructured membranes across the windows. The membrane now comprises pores 6a.

If a Si wafer is used as the support 1, the etching can be wet (e.g. in KOH, HNA, TMAH, EDP or AG) or dry (e.g. in gases, RIE plasma or by ion sputtering).

The etching of monocrystalline Si can be isotropic (i.e. same etching rate in all directions, e.g. etching by HNA) or anisotropic (preferential etching direction, e.g. KOH etching of Si <100>). Anisotropic etching is preferred in this case as it allows better control of the shape and size of the etched window, which also determines the size and shape of the final membrane. Isotropic etching causing vertical walls of the etched windows might be preferable for close-packing multiple membranes on the single support.

During the wet etching process it is important to protect the membrane side (first side) of the Si support from the direct contact with the etching solutions. This can be achieved by coating the first side of the support by etch resistive polymers (e.g. ProTEK® coatings from Brewer Science, Inc.), or by using mechanical clamps that enclose the first side of the support, or by using etching chambers that are attached to the second side of the support.

The lateral dimensions of the etched window should be such that the formed membrane is mechanically stable. The mechanical strength also depends on the membrane thickness and material properties. For $SiO_2$ and $Si_3N_4$ membranes that are 10-500 nm thick, the width of the window at the supporting position can be in the range 1-5000 μm.

Step 7 (Optional). Removal of the Protective Material 7 from the Second Side of the Support 1, so that a Membrane with Open Nanopores 6a is Created on the Support.

The removal can be achieved by chemical etching (e.g. by ozone or by acids) or by physical etching (e.g. by ion sputtering), or by combination of both, e.g. reactive ion etching (RIE).

Step 8 (Optional). Reduction of the Nanopore 6a Diameter.

The nanopore 6a diameter may be reduced in one or more of the following ways:
a) electron bombardment
b) ion bombardment
c) isotropic material deposition Isotropic deposition of the additional material on the membrane can also cause shrinkage of the nanopores if it is deposited on the inner walls of the pores.

Step 9 (Optional). Coating of the Membrane by Functional Coatings 11 on the First Side or Both (i.e. First and Second) Sides.

Various functional coatings 11 are possible and may be selected from one or more of the following:
a) optically active coatings
b) conductive coatings
c) dielectric coatings
d) charged coatings
e) non-fouling coatings
f) chemically active coatings
g) hydrophilic coatings
h) protective coatings Different sides of the membranes and inner walls of the nanopores can be coated with different materials.

The membrane forming material 5, the protective material 7 and/or the pore size reducing material may be different materials or be one and the same material, e.g. $Si_3N_4$.

A limitation of Method 1 is that the membrane thickness determined in Step 2 cannot be larger than the diameter of the colloidal particles applied in Step 1, otherwise Step 3 will be impossible to perform. Nevertheless the membrane thickness can be additionally increased in Step 8c and Step 9.

Method 2

Figure 3:
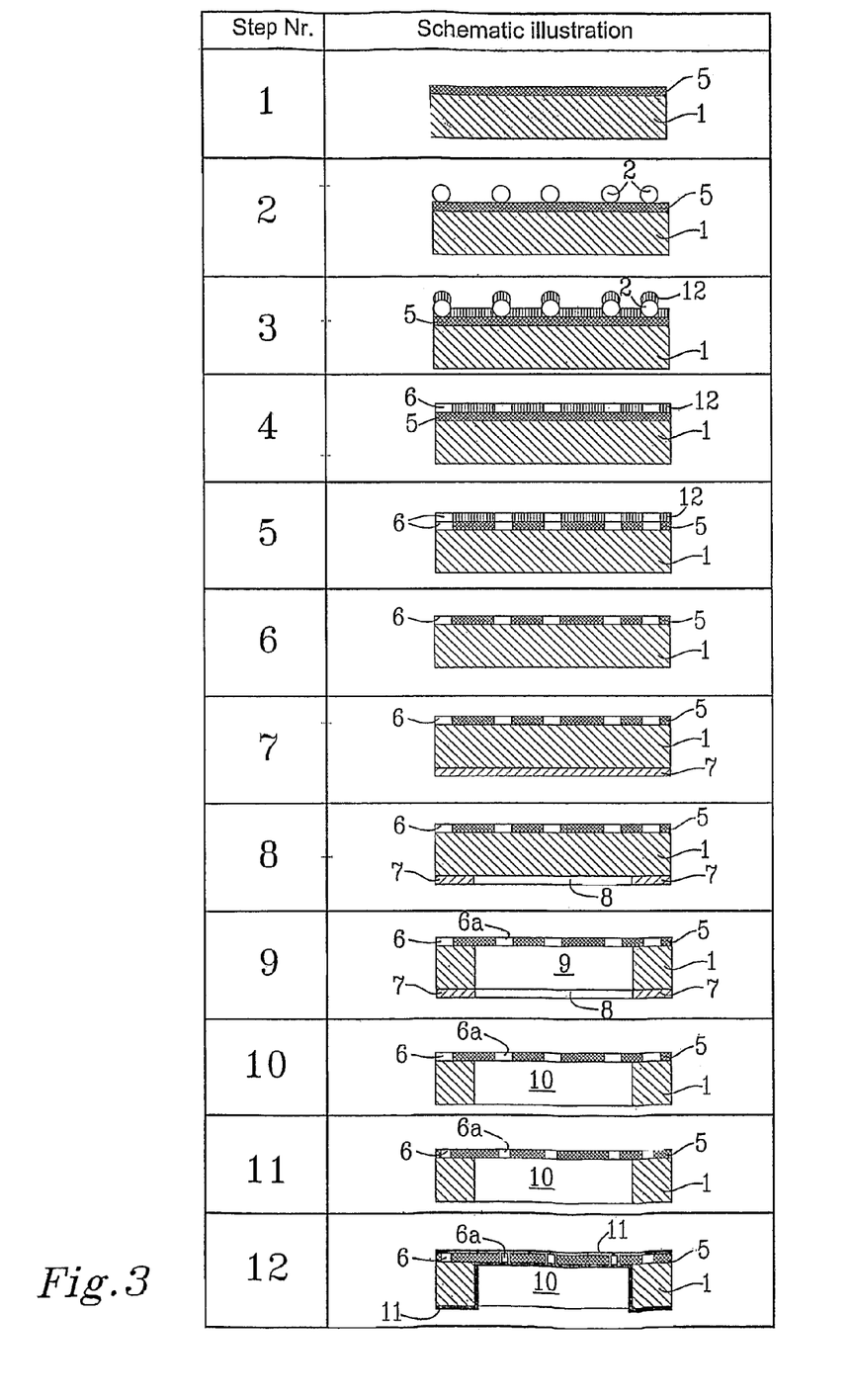
FIG. 3 is a schematic illustration of the steps of a second method of fabrication of nanopores in membranes described in the present invention.

Method 2 is described below, and is illustrated in FIG. 3.

Step 1. Coating the Support 1 (on a First Side or on a First and Second Side) by Membrane Forming Material 5 (e.g. $Si_3N_4$ or $SiO_2$).

Preferably, the membrane forming material 5 is more resistive to the chemical and/or physical etching than the underlying support 1 (e.g. Si). In contrast to Method 1, the thickness of the membrane forming material 5 is not limited to the diameter of the colloidal particle diameter. Typical values for the thickness of the membrane forming material are 100-500 nm.

Step 2. Adsorption of Colloidal Particles 2 on a First Side of the Membrane Material Coated Support 1 (e.g. Si Wafer).

This step was performed in an analogous manner to Method 1, Step 1.

Step 2a (Optional). Reduction of the Colloidal Particle Size by Chemical and/or Physical Etching.

This step was performed in an analogous manner to Method 1, Step 1a.

Step 3. Coating the Membrane Forming Material 5 and the Colloidal Particles 2 by a Layer of Protective Material 12.

The membrane forming material 5 and the colloidal particles 2 were coated by a layer of protective material 12 (e.g. Cr or Ni) which is more resistive to chemical and/or physical etching than the membrane forming material 5. The thickness of the protective material 12 should be equal to or less than the colloidal particle diameter, preferably equal to or less than 50% or 33% of the colloidal particle diameter.

The coating is preferably done by an anisotropic deposition of the material. Depending on the deposition angle (perpendicular or at some inclination to the surface of the membrane forming material 5), differently shaped shadowed areas under the particles will be created. Perpendicular deposition will cause round shadowed area. Inclined deposition will cause elliptic shadowed areas.

Step 4. Removal of the Covered Colloidal Particles 2 from the Protective Material 12 Yielding the Cavities 6 in the Protective Material (12) in the Shadowed Area Beneath Each Colloidal Particle.

This step was performed in an analogous manner to Method 1, Step 3.

Step 5. Etching the Membrane Forming Material 5 Through the Cavities in the Protective Material 12.

Etching the membrane forming material 5 through the cavities in the protective material 12 until the support 1 is reached, which results in the cavities 6 in the membrane forming material corresponding to positions and shadowed geometry of the colloidal particles 2 adsorbed in Step 2.

Step 6 (Optional). If Necessary, Removing the Protective Material 12 from the Membrane.

Step 7 (Optional). Coating a Second Side of the Support Material 1 with Protective Material 7.

This step was performed in an analogous manner to Method 1, Step 4.

Step 8 Performing Photolithography on the Second Side of the Support 1, Said Second Side Being Opposite Side to the First Side where Colloidal Particles were Applied and Removed in Steps 2-4, in Order to Remove the Protective Layer in the Designated Areas 8 (Windows).

This step was performed in an analogous manner as Method 1, Step 5.

Step 9. Etching the Support Material 1.

This step was performed in an analogous manner as Method 1, Step 6.

Step 10 (Optional). Removal of the Protective Material 7 from, the Second Side of the Support 1, so that a Membrane with Open Nanopores 6a is Created on the Support.

This step was performed in an analogous manner to Method 1, Step 7.

Step 11 (Optional). Reduction of the Nanopore 6a Diameter.

This step was performed in an analogous manner as Method 1, Step 8.

Step 12 (Optional). Coating of the Membrane by Functional Coatings 11 on the First Side or Both (i.e. First and Second) Sides.

This step was performed in an analogous manner to Method 1, Step 9.

The membrane forming material 5, the protective material 7 and/or the pore size reducing material may be different materials or be one and the same material, e.g. $Si_3N_4$.

This method has more steps than Method 1 but the maximal thickness of the membrane forming material is not limited by the colloidal particle diameter like in Method 1. In Method 2 the thickness of the membrane forming material may be greater than, equal to or less than the diameter of the particles used in the colloidal lithography.

Method 3

Figure 4:
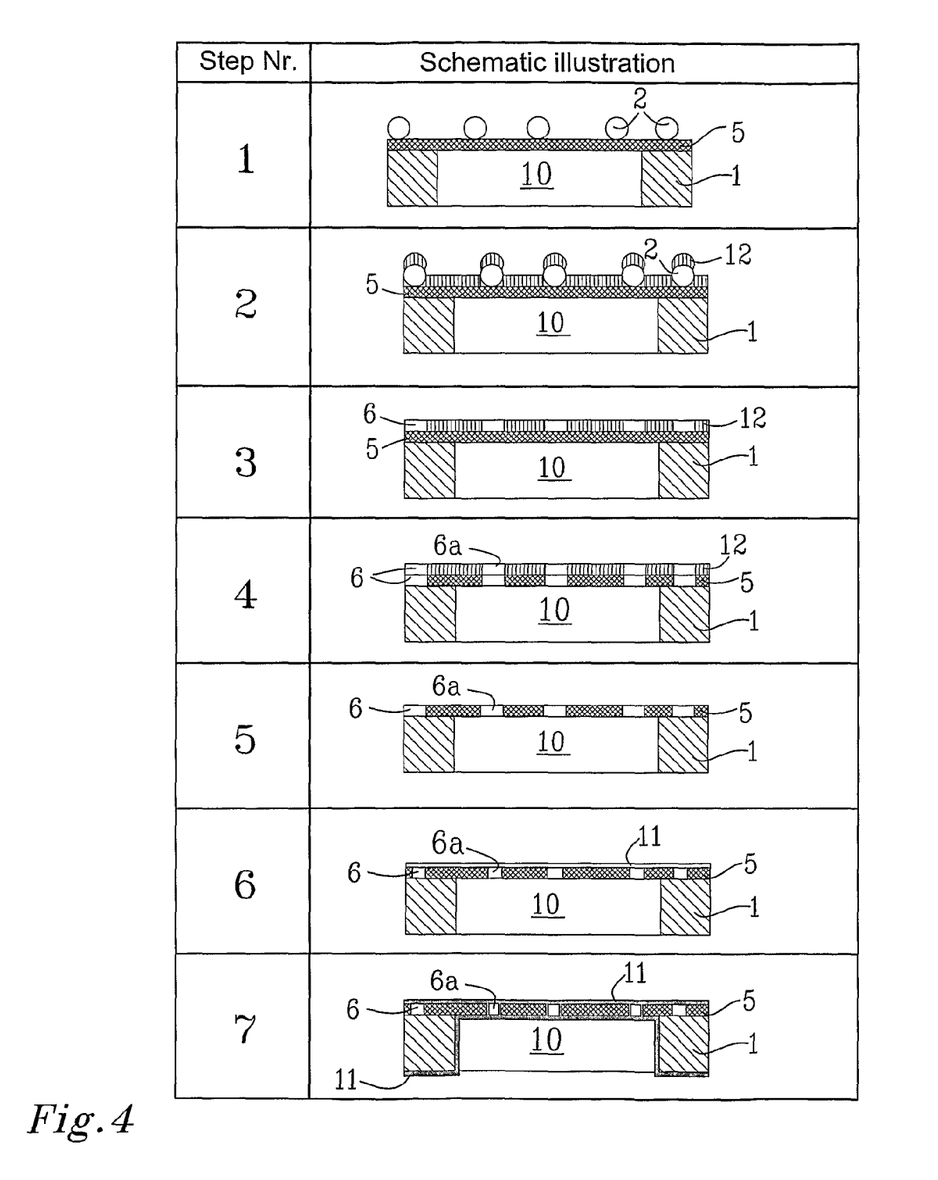
FIG. 4 is a schematic illustration of the steps of a third method of fabrication of nanopores in membranes described in the present invention.

Method 3 is described below, and is illustrated in FIG. 4.

Step 1. Adsorption of Colloidal Particles 2 on a First Side of a Membrane Forming Material 5 which is supported by a support 1.

The window 10 is present from the beginning. This step is performed in an analogous manner to Method 1, Step 1.

Step 1a. (Optional). Reduction of the Colloidal Particle Size by Chemical and/or Physical Etching.

This step was performed in an analogous manner as Method 1, Step 1a.

Step 2. Coating the Support 1 and the Colloidal Particles 2 by a Layer of Protective Material 12.

The membrane forming material 5 and the colloidal particles 2 were coated by a layer of protective material 12 (e.g. Cr or Ni) which is more resistive to chemical and/or physical etching than the membrane forming material 5. The thickness of the protective material should be equal to or less than the colloidal particle diameter, preferably equal to or less than 50% or 33% of the colloidal particle diameter.

The coating is preferably done by an anisotropic deposition of the material. Depending on the deposition angle (perpendicular or at some inclination to the surface of the membrane forming material 5), differently shaped shadowed areas under the particles will be created. Perpendicular deposition will cause round shadowed area. Inclined deposition will cause elliptic shadowed areas.

Step 3. Removal of the Covered Colloidal Particles 2 from the Protective Material 12 Yielding the Cavities 6 in the Protective Material 12 in the Shadowed Area Beneath Each Colloidal Particle.

This step was performed in an analogous manner to Method 1, Step 3.

Step 4. Etching the Membrane Forming Material 5.

Etching the membrane forming material 5 through the cavities 6 in the protective material 12 until the pores 6a in the membrane material are formed corresponding to positions and shadowed geometry of colloidal particles 2 adsorbed in Step 1.

Step 5. (Optional). If Necessary, Removing the Protective Material 12 from the Membrane Material 5.

Step 6 (Optional). Reduction of the Nanopore 6a Diameter.

This step was performed in an analogous manner to Method 1, Step 8.

Step 7 (Optional). Coating of the Membrane Comprising the Pores 6a by Functional Coatings on the First Side or on Both (i.e. First and Second) Sides.

This step was performed in an analogous manner to Method 1, Step 9.

Method 3 can be applied on pre-fabricated intact membranes (e.g. commercially available TEM windows) in order to produce nanoporous membranes. Step 3 is a critical step because mechanical removal of colloidal particles might easily destroy the brittle membranes. To avoid breaking of the membrane when unsupported, a temporary mechanical support of the membrane can be created by depositing a thick polymer layer on the second side of the polymer membrane within the window in the support.

In Method 3 the thickness of the membrane forming material may be greater than, equal to or less than the diameter of the particles used in the colloidal lithography.

In Methods 1, 2 and 3 above the removal of the colloidal particles takes place using an adhesive material, for instance an adhesive tape (such as a Scotch tape) or a glue-less adhesive tape, without breaking the thin membrane and while maintaining low surface roughness. The low surface roughness renders the membranes suitable in applications where low surface roughness is important, e.g. in medical and biomedical applications. It is known that applying an adhesive material to non-colloidal particles adsorbed on a membrane material or support affords strong adhesion which often result in breaking the membrane material or support upon removal of the adhesive material.

Embodiments of the Invention

In a first embodiment the present invention provides a method for producing a membrane comprising nanosized pores, said method comprises the steps of:
a) providing a support comprising a first and a second opposite side,
b) depositing and adsorbing colloidal particles on said first side of said support,
c) depositing a film of a membrane material on said colloidal particles and the support,
d) applying an adhesive material onto the colloidal particles covered by the membrane forming film, e) mechanically removing said covered colloidal particles from said support by means of peeling off the adhesive material together with the colloidal particles, wherein at least part of the membrane forming film covering the colloidal particles is removed from the support, while a perforated membrane forming film remains on the support, f) forming a window in said support throughout the thickness of the support with respect to said perforated membrane to reveal said membrane from the second side of the support.

In a further embodiment the present invention provides a method according to the first embodiment of the invention, wherein a protective layer is applied to the perforated membrane forming film after step e) and is removed after step f).

It is to be understood that after step c) of the first embodiment the support is covered by said membrane forming film except substantially in the contact area with the colloidal particles. The membrane forming film will not attach itself to the support in the contact area between the colloidal particles and the support. Due to the shape and size of the colloidal particles, the membrane film may also be prevented from attaching itself to the support in at least part of the area (immediately) surrounding the colloidal particles.

In a second embodiment the present invention provides a method for producing a membrane comprising nanosized pores, said method comprises the steps of:

a) providing a membrane forming material comprising a first and a second opposite side, b) depositing and adsorbing colloidal particles on said first side of said membrane forming material, c) depositing a film of protective material on said colloidal particles and membrane material, d) applying an adhesive material onto the colloidal particles covered by the protective material, e) mechanically removing said colloidal particles covered by the protective material from said membrane forming material by means of peeling off the adhesive material together with the colloidal particles, wherein at least part of the protective material film covering the colloidal particles is removed from the membrane forming material, while a perforated protective material film remains on the membrane forming material, f) etching the membrane forming material through the perforations in the protective material so that a perforated membrane is formed.

It is to be understood that after step c) of the second embodiment the membrane forming material is covered by said protective material except substantially in the contact area with the colloidal particles. The protective material will not attach itself to the membrane forming film in the contact area between the colloidal particles and the membrane forming material Due to the shape and size of the colloidal particles, the protective material may also be prevented from attaching itself to the membrane forming material in at least part of the area (immediately) surrounding the colloidal particles.

In a third embodiment the present invention provides a method according to the second embodiment of the invention, characterized in that said membrane forming material is applied on a support having a first and a second opposite side, wherein the membrane forming material is applied on the first side of the support and wherein a window is formed in the support throughout the thickness of the support to reveal said membrane from the second side of the support, said window is formed either before or after perforating the membrane forming material to produce said membrane with nanosized pores.

In a further embodiment the present invention provides a method according to the second or third embodiment of the invention, wherein the membrane forming film has a thickness which is greater than, equal to or less than the diameter of the particles used in the colloidal lithography.

In a fourth embodiment the present invention provides a method according to the second or third embodiment of the invention further comprising removal of the protective material after etching the membrane forming material.

In a fifth embodiment the present invention provides a method according to any previous embodiment of the invention further comprising reduction of the adsorbed colloidal particles by chemical and/or physical etching before depositing a film of membrane forming material or protective material on said adsorbed colloidal particles.

In a sixth embodiment the present invention provides a method according to any previous embodiment of the invention, wherein the window in the support is formed by lithographic etching technique.

In a seventh embodiment the present invention provides a method according to any previous embodiment of the invention, wherein the membrane forming film comprises silicon compounds such as silicon nitride or silicon oxide, or a metal such as chromium, gold, nickel or aluminium or a combination of the listed materials.

In a $8^{th}$ embodiment the present invention provides a method according to any previous embodiment of the invention wherein the support comprises silicon or germanium.

In a $9^{th}$ embodiment the present invention provides a method according to any previous embodiment of the invention, wherein the protective material is a silicon compound such as silicon nitride or silicon oxide; a polymer material or a metal such as chromium, gold, nickel or aluminium.

In a $10^{th}$ embodiment the present invention provides a method according to any previous embodiment of the invention, wherein the colloidal particles are made of polystyrene, oxides such as $SiO_2$ or metal oxides such as $Al_2O_3$ or $TiO_2$.

In a $11^{th}$ embodiment the present invention provides a method according to any previous embodiment of the invention, wherein the colloidal particles have a size from 3 to 3000 nm.

In a $12^{th}$ embodiment the present invention provides a method according to any previous embodiment of the invention, wherein the membrane forming film or the protective material which covers the colloidal particles has a thickness which is equal to or less than the diameter of the particles used in the colloidal lithography, preferably equal to or less than 50% or 33% of the diameter of the particles used in the colloidal lithography.

In a $13^{th}$ embodiment the present invention provides a method according to any previous embodiment of the invention further comprising reduction of the diameter of the nanosized pores.

In a $14^{th}$ embodiment the present invention provides a method according to any previous embodiment of the invention further comprising coating of the membrane by one or more functional coating.

In a $15^{th}$ embodiment the present invention provides a membrane produced by a method according to any previous embodiment.

In a further embodiment the present invention provides a method according to any previous embodiment of the invention, wherein the steps are performed in a different order.

In a further embodiment the invention provides a method according to any previous embodiment of the invention, wherein the colloidal particles or nanosized pores are between 3 and 3000 nm.

In a further embodiment the invention provides a method according to any previous embodiment of the invention, wherein the colloidal particles or nanosized pores are between 5 and 300 nm.

In a further embodiment the invention provides a method according to the first to any previous embodiment of the invention, wherein the colloidal particles or nanosized pores are between 30 and 300 nm.

In a further embodiment the invention provides a method according to any previous embodiment of the invention, wherein the colloidal particles or nanosized pores are between 80 and 150 nm.

All embodiments may be combined with any other aspect, embodiment or claim of the invention described hereinbefore or hereinafter.

In a further embodiment the invention provides a method according to any previous embodiment of the invention, wherein the colloidal particles or nanosized pores are about 100 nm.

In a further embodiment the invention provides a method according to any previous embodiment of the invention, wherein the thickness of the membrane is 100 nm or less.

In a further embodiment the invention provides a method according to any previous embodiment of the invention, wherein the thickness of the membrane is between 30 and 100 nm.

In a further embodiment the invention provides a membrane produced according to any embodiment mentioned hereinbefore or hereinafter.

In a further embodiment the invention provides a membrane produced according to any previous embodiment comprising silicon nitride or silicon oxide, wherein said membrane has a thickness equal to or less than 100 nm and comprises at least one nanosized pore which is/are randomly arranged and has/have a narrow size distribution.

In a further embodiment the invention provides a membrane produced according to any previous embodiment, wherein said membrane comprises nanosized pores which are randomly arranged, have a narrow size distribution and a controlled mean inter-pore distance.

All embodiments hereinbefore or hereinafter may be combined with any other aspect, embodiment or claim of the invention described hereinbefore or hereinafter.

In a further embodiment of the present invention there is provided the use of a membrane produced by a method according to any previous embodiment as a biosensor, in a drug delivery system, for the sieving, separation or purification of small molecules or biomolecules, for filtering of gases or liquids from microbes, bacteria, viruses, small particles, molecules or ions; or in a fuel cell membrane.

In a further embodiment of the present invention there is provided the use of a membrane produced by a method according to any previous embodiment, wherein the filtering through the membrane takes place in a direction which is cross flow or tangential flow with respect to the membrane.

In a further embodiment of the present invention there is provided a combination of several membranes, which are produced by one or several methods according to any previous embodiment.

In a further embodiment the present invention provides a method according to any previous embodiment of the invention, wherein the distance between the colloidal particles is controlled by addition of ions of opposite sign to that of the colloidal particles to the colloidal solution.

In a further embodiment the present invention provides a method according to any previous embodiment of the invention, wherein the support is coated on the second side by a membrane forming material or a protective material prior to or after removal of the colloidal particles.

The above embodiments may be combined with any other aspect, embodiment or claim of the invention described hereinbefore or hereinafter.

The invention is further illustrated, but not limited, by the following Example.

EXAMPLE

Nanopores were fabricated on a $Si_3N_4$ membrane according to steps 1-5 of Method 3 described above, thus excluding Steps 6-7.

Prior to step 1, the membrane surface was treated in oxygen plasma for 30 s (50 W, 250 mTorr, PlasmaTherm Batchtop VII RIE/PE 95M). Then, a triple charging layer was deposited by the following steps:

1) immersion of the membrane in 2% PDDA aqueous solution for 30 seconds, rinsed in running water for 30 seconds and spin-dried at 3000 rpm;
2) immersion of the membrane in 2% PSS aqueous solution for 30 seconds, rinsed in running water for 30 seconds and spin-dried at 3000 rpm;
3) immersion of the membrane in 5% ACH 5% aqueous solution for 30 seconds, rinsed in running water for 30 seconds and spin-dried at 3000 rpm.

In Step 1, monodisperse (110 nm 5 nm) polystyrene (PS) spheres (sulphate latex suspended in water (0.2% by weight) purchased from Interfacial Dynamics Corporation, Oregon, USA) were dispensed on the membrane and kept for 2 minutes. Then the wafer was rinsed in running water for 30 seconds and dried by blowing nitrogen.

In Step 2, 10 nm of chromium (Cr) was deposited by e-beam evaporation (AVAC HVC-600).

The colloidal particles and the material covering them were removed by applying adhesive tape (SWT-10, Nitto Scandinavia AB) in Step 3.

The pores were etched into the membrane where it was not protected by Cr using plasma etching (2.5 min. at 100 W, 25 mTorr, PlasmaTherm Batchtop VII RIE/PE 95M) in Step 4.

The Cr layer was removed by wet etching in mixture of 6 wt % Nitric Acid and 16% Ceric Ammonium Nitrate in Step 5.

Figure 5:
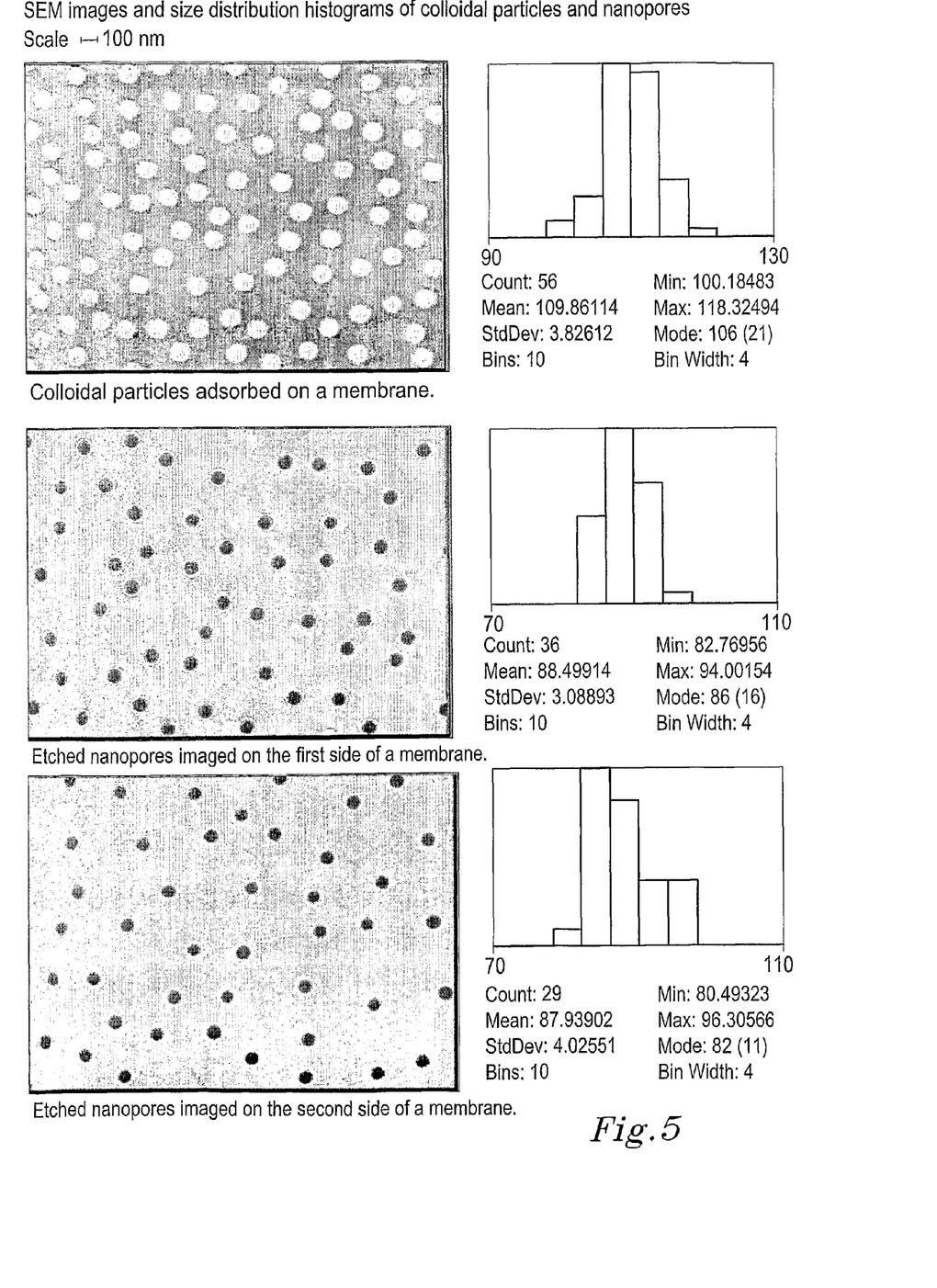
FIG. 5 is an illustration of SEM images and size distribution histograms of colloidal particles and nanopores.

The adsorbed particles and the etched nanopores were imaged by scanning electron microscope (SEM, JEOL JSM-6301F). Particle size and distribution was analysed using Image J v1.40 (NIH, USA) software for counting area, diameter and coordinates of individual particles. The results are presented in terms of particle diameter distribution histogram.

What is claimed is:

1. A method for producing a membrane comprising nanosizes pores, said method comprises the steps of:
    a) providing a support comprising a first and a second opposite side,
    b) depositing and adsorbing colloidal particles on said first side of said support,
    c) depositing a film of a membrane material on said colloidal particles and support,
    d) applying an adhesive material onto the colloidal particles covered by the membrane forming film,
    e) mechanically removing said covered colloidal particles from said support by means of peeling off the adhesive material together with the colloidal particles, wherein at least part of the membrane forming film covering the colloidal particles is removed from the support, while a perforated membrane forming film remains on the support, f) forming a window in said support throughout the thickness of the support with respect to said perforated membrane to reveal said membrane from the second side of the support.

2. A method for producing a membrane comprising nano-sized pores, said method comprising the steps of:
a) providing a membrane forming material comprising a first and a second opposite side,
b) depositing and adsorbing colloidal particles on said first side of said membrane forming material,
c) depositing a film of protective material on said colloidal particles and membrane forming material,
d) applying an adhesive material onto the colloidal particles covered by the protective material,
e) mechanically removing said colloidal particles covered by the protective material from said membrane forming material by means of peeling off the adhesive material together with the colloidal particles, wherein the colloidal particles and at least part of the protective material film covering the colloidal particles is removed from the membrane forming material, while a perforated protective material film remains on the membrane forming material,
f) etching the membrane forming material through the perforations in the protective material so that a perforated membrane is formed.

3. A method according to claim 2, wherein said membrane forming material is applied on a support having a first and a second opposite side, wherein the membrane forming material is applied on the first side of the support and wherein a window is formed in the support throughout the thickness of the support to reveal said membrane from the second side of the support, said window is formed either before or after perforating the membrane forming material to produced said membrane with nanosized pores.

4. A method according to claim 2 further comprising removal of the protective material after etching the membrane forming material.

5. A method according to claim 1 further comprising reduction of the adsorbed colloidal particles by chemical and/or physical etching before depositing a film of membrane forming material or protective material on said adsorbed colloidal particles.

6. A method according to claim 1, wherein the window in the support is formed by lithographic etching technique.

7. A method according to claim 1, wherein the membrane forming film comprises silicon compounds comprising silicon nitride, or silicon oxide, or a metal such as chromium, gold, nickel, or aluminum or a combination of the listed materials.

8. A method according to claim 1, wherein the support comprises silicon or germanium.

9. A method according to claim 2, wherein the protective material is a silicon compound comprising silicon nitride or silicon oxide; a polymer material or a metal comprising chromium, gold, nickel or aluminum.

10. A method according to claim 1, wherein the colloidal particles are made of a polymer material comprising polystyrene; oxides comprising $SiO_2$, or metal oxides comprising $Al_2O_3$ or $TiO_2$.

11. A method according to claim 1, wherein the colloidal particles have a size from 3 to 3000 nm.

12. A method according to claim 1, wherein the membrane forming film which covers the colloidal particles has a thickness which is equal to or less than the diameter of the particles used in the colloidal lithography, preferably equal to or less than 50% or 33% of the diameter of the particles used in the colloidal lithography.

13. A method according to claim 1 further comprising reduction of the diameter of the nanosized pores.

14. A method according to claim 1 further comprising coating of the membrane by one or more functional coating.

15. A method according to claim 3 further comprising removal of the protective material after etching the membrane forming material.

16. A method according to claim 2 further comprising reduction of the adsorbed colloidal particles by chemical and/or physical etching before depositing a film of membrane forming material or protective material on said adsorbed colloidal particles.

17. A method according to claim 2, wherein the window in the support is formed by lithographic etching technique.

18. A method according to claim 2, wherein the membrane forming film comprises silicon compounds comprising silicon nitride or silicon oxide, or a metal comprising chromium, gold, nickel, or aluminum or a combination of the listed materials.

19. A method according to claim 2, wherein the support comprises silicon or germanium.

20. A method according to claim 2, wherein the protective material is a silicon compound comprising silicon nitride or silicon oxide; a polymer material or a metal comprising chromium, gold, nickel or aluminum.

21. A method according to claim 2, wherein the colloidal particles are made of a polymer material comprising polystyrene; oxides such as $SiO_2$ or metal oxides comprising $Al_2O_3$ or $TiO_2$.

22. A method according to claim 2, wherein the colloidal particles have a size from 3 to 3000 nm.

23. A method according to claim 2, wherein the membrane forming film or the protective material which covers the colloidal particles has a thickness which is equal to or less than the diameter of the particles used in the colloidal lithography, preferably equal to or less than 50% or 33% of the diameter of the particles used in the colloidal lithography.

24. A method according to claim 2 further comprising reduction of the diameter of the nanosized pores.

25. A method according to claim 2 further comprising coating of the membrane by one or more functional coating.

* * * * *